(12) United States Patent
Hales et al.

(10) Patent No.: US 12,741,238 B2
(45) Date of Patent: Sep. 22, 2026

(54) FLAT FILTER MEDIA

(71) Applicant: BULLFROG INTERNATIONAL, LC, Herriman, UT (US)

(72) Inventors: Eric Hales, Eagle Mountain, UT (US); Todd Anderson, Lehi, UT (US); Mark McLane, Lehi, UT (US); Richard Alex Eddington, South Jordan, UT (US); Jeremy J. Evans, Sandy, UT (US)

(73) Assignee: BULLFROG INTERNATIONAL, LC, Herriman, UT (US)

( * ) Notice: Subject to any disclaimer, the term of this patent is extended or adjusted under 35 U.S.C. 154(b) by 330 days.

(21) Appl. No.: 18/236,318

(22) Filed: Aug. 21, 2023

(65) Prior Publication Data

US 2025/0065250 A1 Feb. 27, 2025

(51) Int. Cl.

| | |
|---|---|
| ***B01D 29/03*** | (2006.01) |
| ***C02F 1/00*** | (2023.01) |
| ***C02F 103/42*** | (2006.01) |
| ***E04H 4/12*** | (2006.01) |

(52) U.S. Cl.

CPC .............. *B01D 29/031* (2013.01); *C02F 1/00* (2013.01); *E04H 4/1209* (2013.01); *B01D 2201/127* (2013.01); *B01D 2201/184* (2013.01); *B01D 2201/287* (2013.01); *B01D 2201/31* (2013.01); *C02F 2103/42* (2013.01)

(58) Field of Classification Search

CPC ......................... B01D 46/521; B01D 29/0095; B01D 29/031; B01D 29/016; B01D 2201/12; B01D 2201/127; B01D 2201/184; B01D 2201/287; B01D 2201/31; E04H 4/1209; C02F 1/00

USPC ........................................... 210/493.1, 493.3

See application file for complete search history.

(56) References Cited

U.S. PATENT DOCUMENTS

| | | | | |
|---|---|---|---|---|
| 2,071,806 A | | 2/1937 | Walker | |
| 4,533,476 A | | 8/1985 | Watkins | |
| 5,800,702 A | | 9/1998 | Taylor-McCune et al. | |
| 5,868,889 A | * | 2/1999 | Kahler .................. | B01D 46/10 156/247 |
| 6,395,167 B1 | | 5/2002 | Mattson, Jr. et al. | |
| 6,846,342 B2 | | 1/2005 | Mertz et al. | |
| 10,252,207 B2 | | 4/2019 | Mouanda et al. | |

(Continued)

FOREIGN PATENT DOCUMENTS

| | | | | |
|---|---|---|---|---|
| DE | 10153642 B4 | | 8/2009 | |
| DE | 102011111368 A1 | * | 2/2013 | ............ B01D 46/10 |

(Continued)

OTHER PUBLICATIONS

Koch, DE 102009019859, English machine translation, pp. 1-5 (Year: 2017).*

(Continued)

*Primary Examiner* — Claire A Norris

(74) *Attorney, Agent, or Firm* — Sarah W. Matthews; Lilly Godfrey

(57) ABSTRACT

This disclosure relates generally to a filter media that can be used to filter a spa, hot tub, or pool. The filter media can include a body with a top surface, a bottom surface, and a plurality of pleats. A border is joined and surrounding a periphery of the body, the border for maintaining a planar shape of one or more of the top surface and bottom surface of the filter media.

20 Claims, 8 Drawing Sheets

(56) References Cited

U.S. PATENT DOCUMENTS

| | | | | |
|---|---|---|---|---|
| 11,808,285 | B2 | 11/2023 | Tulett et al. | |
| 2005/0211613 | A1 | 9/2005 | King | |
| 2007/0289057 | A1 | 12/2007 | Ludlow | |
| 2010/0051530 | A1 | 3/2010 | Manz et al. | |
| 2013/0219844 | A1 * | 8/2013 | Sullivan | B01D 46/522 55/496 |
| 2019/0048604 | A1 | 2/2019 | Guy et al. | |
| 2020/0129907 | A1 * | 4/2020 | Fox | B01D 46/0001 |
| 2021/0199136 | A1 * | 7/2021 | Tulett | B01D 29/15 |

FOREIGN PATENT DOCUMENTS

| | | | | |
|---|---|---|---|---|
| DE | 102014013144 | A1 | 4/2015 | |
| DE | 102009019859 | B4 * | 2/2017 | B01D 46/523 |
| EP | 0377419 | A1 * | 7/1990 | B01D 46/523 |
| EP | 2072106 | A1 | 6/2009 | |
| WO | 2019032892 | A1 | 2/2019 | |

OTHER PUBLICATIONS

Kjell, EP 0377419, English machine translation, pp. 1-2 (Year: 1990).*

Wedemann et al, DE 102011111368, English machine translation, pp. 1-4 (Year: 2013).*

Australian Patent Office, “First Examination Report,” Australian Application No. 2020260543, Oct. 22, 2021.

Canadian Patent Office, “Examiner's Report,” Canadian Application No. 3,097,724, Oct. 28, 2021.

Legend Series™ Macro Flat Filter—X298600—PMA50-2002-F (masterspapartsonline.com).

Australian Patent Office “Examination Report No. 1,” for Australian Patent Application No. 2024211015, Aug. 18, 2025.

European Patent Office, “Extended European Search Report,” for European Patent Application No. 24195475.9, of Jan. 22, 2025.

Intellectual Property Office of New Zealand, “Examination Report 1,” for New Zealand Patent Application No. 813722, Jan. 30, 2026.

* cited by examiner

FLAT FILTER MEDIA

TECHNICAL FIELD

This disclosure relates generally to filters and, more specifically, to filters for spas, pools, and other water-based structures.

SUMMARY

Disclosed are systems, devices, and/or methods of use thereof regarding filters and, more specifically, filters for spas, pools, and other water-based structures. In various aspects, a filter media according to the present disclosure includes a plurality of sections, where each section of the plurality of sections is adhesively joined to an adjacent section and each section includes a plurality of pleats. The filter media may also include a border joined to and surrounding a periphery of the plurality of sections, with the border maintaining a non-circular shape of the filter media. In some embodiments, each pleat of the plurality of pleats extends across a width of each section and each pleat of the plurality of pleats has a consistent spacing along a length of the pleat, such that fluid passing through the filter media passes through an entirety of each pleat. In some embodiments, the plurality of pleats are uniformly spaced apart from each other along a length and/or width of the filter media, such that the fluid passing through the filter media passes through each pleat of the plurality of pleats.

In some embodiments, a filter media includes a body having a top surface or outer surface, a bottom surface, and a plurality of sections. The filter media may also include a border joined to and surrounding a periphery of the body, with the border for maintaining a shape of the filter media. Each pleat of the plurality of pleats may extend across a width of each section and extend from the top surface to the bottom surface of the body. Additionally, each pleat of the plurality of pleats may have a consistent spacing along a length of the pleat such that fluid passing through the filter media passes through an entirety of each pleat. Further, the plurality of pleats may be uniformly spaced apart from each other along a length and/or width of the filter media, such that the fluid passing through the filter media passes through each pleat of the plurality of pleats.

In some embodiments, a filter media includes a body having a top surface, a bottom surface, and a plurality of sections, with each section including a plurality of pleats. The filter media may also include a border surrounding the body and maintaining a non-circular shape of the filter media.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 1:
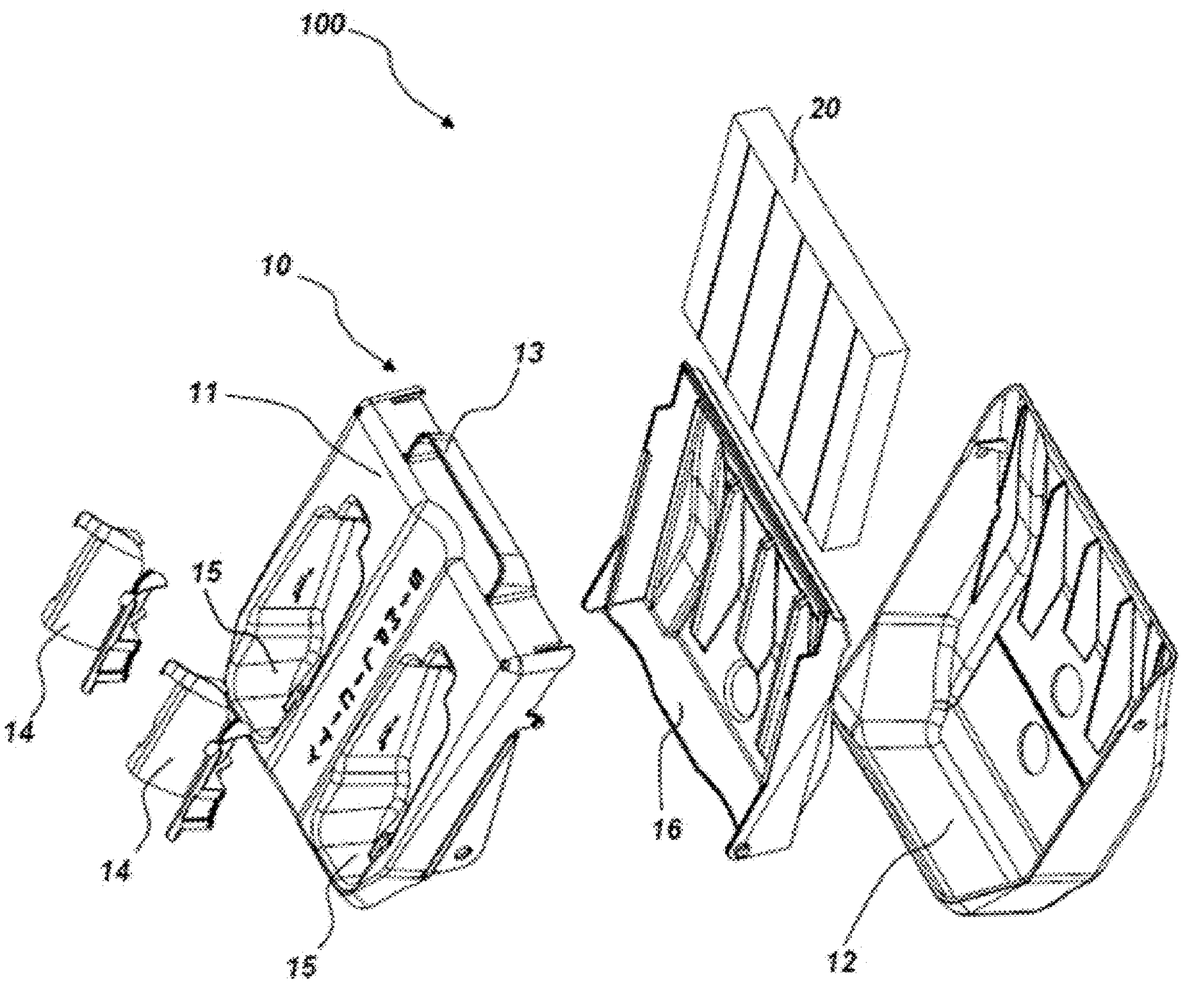
FIG. 1 illustrates an exploded view of a filter media and a filter housing.

Spas, pools, and other water containing vessels are typically fitted with filters to clean water contained therein. Filters of various configurations are used to remove solid particles and debris from the water circulating through the spa, pool, or water containing vessel. Filters are typically mounted in-line within the pool or spa circulation system and have a liquid-permeable filter media such that, when the circulation system is in operation, water can be pulled through the filter and pumped back into the pool or spa, leaving the captured debris on the filter for subsequent removal.

One type of filter often used is a conventional cartridge filter. It is comprised of a cylindrical filter element with one or more layers or sheets of a porous material configured with a pore size to allow the passage of water while trapping and removing the solid particles. As the filter traps more and more solid particles, the pores in the filter media become clogged, inhibiting the flow of water through the circulation system and decreasing performance and possibly even damaging the circulation pump. Cartridge filters typically use relatively large sheets of the porous filter material that are pleated to provide an increased filter surface area, thus increasing the life and performance of the filter, while not increasing the filter's overall size.

However, as particles and debris become lodged between the pleats, the useful filter surface area of the pleats decreases. Due to the circular and cylindrical configuration of the filters, some portions of the filters are often clogged and become unusable well before other portions of the filters. In conventional cylindrical filters, this decrease in useful filter surface area is effectively doubled because the particles and debris clog pores on both adjacent surfaces (e.g., faces) of the pleat. Additionally, outer edges or portions of the filter material may become clogged and filled with debris well before inner edges or portions of the filter material become clogged and filled with debris. This is because the pleats of the filter material at the outer edges of conventional pool filters are further apart from each other than at the inner edges; at the inner edges, the layers are compacted and condensed next to each other, often with little or no space between them.

As water is pumped through these conventional cylindrical filters, the filter material at the outer edges is fully exposed to the flow of water while the filter material at the inner edges is, in some cases, not exposed to the flow of water at all. Thus, the filter media at the inner edges of conventional pool filters provides almost no filtering effect while the filter media at the outer edges quickly becomes clogged. As such, the conventional pool filters need to be replaced more frequently despite there being a substantial portion of filter media left untouched.

Thus, cartridge filters become clogged and experience decreased flow rates relatively quickly. Another problem with cartridge filters is that they cannot be readily cleaned after becoming clogged. To clean debris trapped deep within the pleat folds, high pressure reverse flow or meticulous debris removal using a vacuum or manual technique between each pleat is necessary. Often, the cartridge must be soaked overnight in a cartridge cleaning solution and then be thoroughly cleaned a second time before being returned to use. Because of these inconveniences, some pool and spa owners simply use their cartridge filters until they become clogged and discard them, often prematurely, rather than bothering to clean them out.

Another problem with conventional filtrations systems is that they may not adequately remove particles and impurities in the water, especially when the filter has not been cleaned or replaced for some time. This may result in unsatisfactory and unsanitary conditions for the user, and may also result in degradation of system components.

Various embodiments of the present disclosure address these and other issues with filters. For example, disclosed filters allow for a full and efficient use of the media making up the filter, such that less media (e.g., fabric, material, glue, etc.) is required for any given filter. This leads to reductions in costs of materials, waste, money, and time, as consumers need to replace their filters less frequently. Additionally, as discussed below, the arrangement of the media within the disclosed filters (e.g., inclusion of a plurality of pleats) allows for higher particulate loading of any particular point within the media and/or the filter. In contrast to typical cylindrical filters, the arrangement of the media can withstand a higher threshold of particulate loading before failing or requiring replacement. Further, the disclosed filters are intended to be disposable, meaning messy cleaning of conventional filters can be eliminated.

Disclosed are systems, devices, and/or methods of use thereof regarding filters and, more specifically, filters for spas, pools, and other water-based structures. In various aspects, a filter media according to the present disclosure includes plurality of pleats. The filter media may also include a border joined to and surrounding a periphery of the plurality of sections, with the border maintaining a non-circular shape of the filter media. In some embodiments, each pleat of the plurality of pleats extends across a width of each section and each pleat of the plurality of pleats has a consistent spacing along a length of the pleat, such that fluid passing through the filter media passes through an entirety of each pleat. In some embodiments, the plurality of pleats are uniformly spaced apart from each other along a length and/or width of the filter media, such that the fluid passing through the filter media passes through each pleat of the plurality of pleats.

In some embodiments, a filter media includes a body having a top surface, a bottom surface, and a plurality of sections, with each section of the plurality of sections being adhesively joined to an adjacent section, and each section having a plurality of pleats. The filter media may also include a border joined to and surrounding a periphery of the body, with the border for maintaining a shape of the filter media. Each pleat of the plurality of pleats may extend across a width of each section and extend from the top surface to the bottom surface of the body. Additionally, each pleat of the plurality of pleats may have a consistent spacing along a length of the pleat such that fluid passing through the filter media passes through an entirety of each pleat. Further, the plurality of pleats may be uniformly spaced apart from each other along a length and/or width of the filter media, such that the fluid passing through the filter media passes through each pleat of the plurality of pleats.

In some embodiments, a filter media includes a body having a top surface, a bottom surface, and a plurality of sections, with each section including a plurality of pleats. The filter media may also include a border surrounding the body and maintaining a non-circular shape of the filter media.

Filter Assembly

FIG. 1 illustrates an exploded view of a filter system or assembly 100 including a filter media 20 and a filter housing 10. Other examples of a filter system and filter housing are outlined in U.S. patent application Ser. No. 17/131,327 filed Dec. 22, 2020, and entitled, "SPA FILTRATION SYSTEM AND METHOD," the entire contents of which are herein incorporated by reference. As illustrated, the filter housing 10 includes a front plate 11, a back plate 12, and a filter frame 16. The filter media 20 may be positioned between the front plate 11 and back plate 12, and in some configurations the filter media 20 is positioned between the front plate 11 and the filter frame 16. As illustrated, the front plate 11 includes a handle 13 to facilitate easy removal and placement of at least a portion of the filter housing 10 within a spa or pool, for example. In some embodiments, the back plate 12 includes the handle 13. The filter frame 16 may define an opening or slot to receive the filter media 20. The front and back plates 11, 12 may together define an opening to receive the filter frame 16 and the filter media 20.

In some embodiments, the front plate 11 of the filter housing 10 includes or defines one or more openings 15. The one or more openings 15 may be configured to receive one or more water treatments, such as one or more mineral cartridges. The one or more water treatments (e.g., one or more mineral cartridges) may be removably received by the one or more openings 15, allowing a user to easily remove and replace water treatments as needed and/or desired. In some embodiments, the filter assembly 100 includes one or more adapters 14 for attaching one or more mineral cartridges to the one or more openings 15. The adapters 14 may be receivable within the one or more openings 15 and may facilitate connection of mineral cartridges to the housing 10.

Figure 2A:
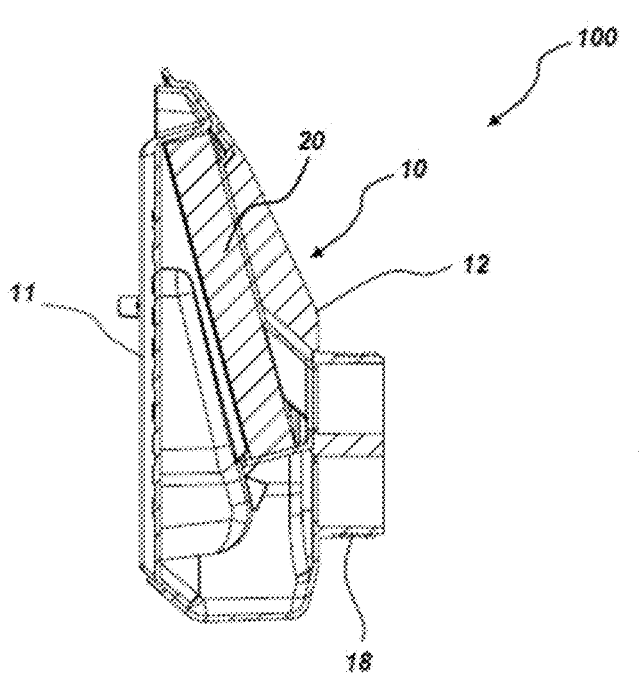
FIGS. 2A-2B illustrate side views of the filter assembly of FIG. 1.
Figure 2B:
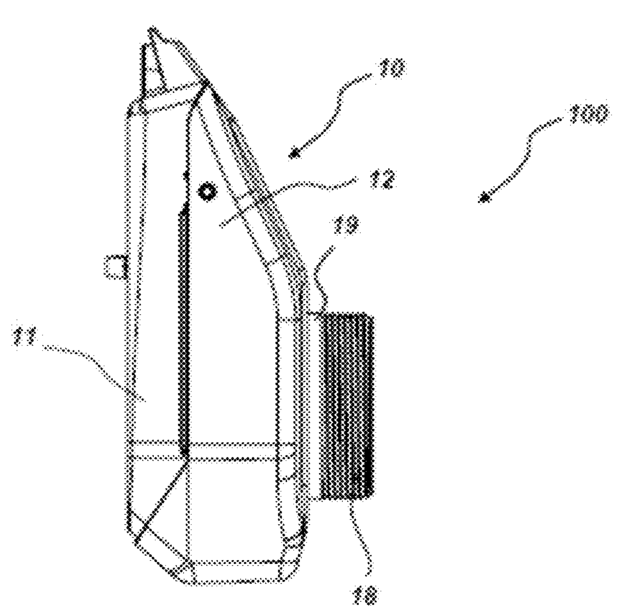

FIGS. 2A-2B illustrate side views of the filter assembly 100 of FIG. 1. Specifically, the cross-sectional view of FIG. 2A illustrates the filter media 20 housed within and between the front plate 11 and the back plate 12 of the housing 10. The front plate 11 and the back plate 12 may be hingedly connected to each other, such that the front plate 11 can hinge open to expose the filter media 20 contained within. This allows the filter media 20 to be easily removed and replaced within the filter housing 10 as needed without requiring removal of the entire housing 10.

Though not visible in FIG. 2A, the filter media 20 is received by the filter frame 16. The filter housing 10 can also include a spa connector 18 and a gasket or seal 19 attached to the back plate 12 of the housing 10. In some embodiments, the spa connector 18 facilitates attachment of the filter housing 10 to a spa or pool; the gasket 19 may facilitate a water- or fluid-tight seal between the filter housing 10 and the spa or pool. The spa connector 18 may also place the filter housing 10 (and the filter media 20) in fluid communication with a fluid contained by the spa or pool, allowing the fluid to be passed through the filter housing 10 and filtered by the filter media 20.

Filter Media

Figure 3A:
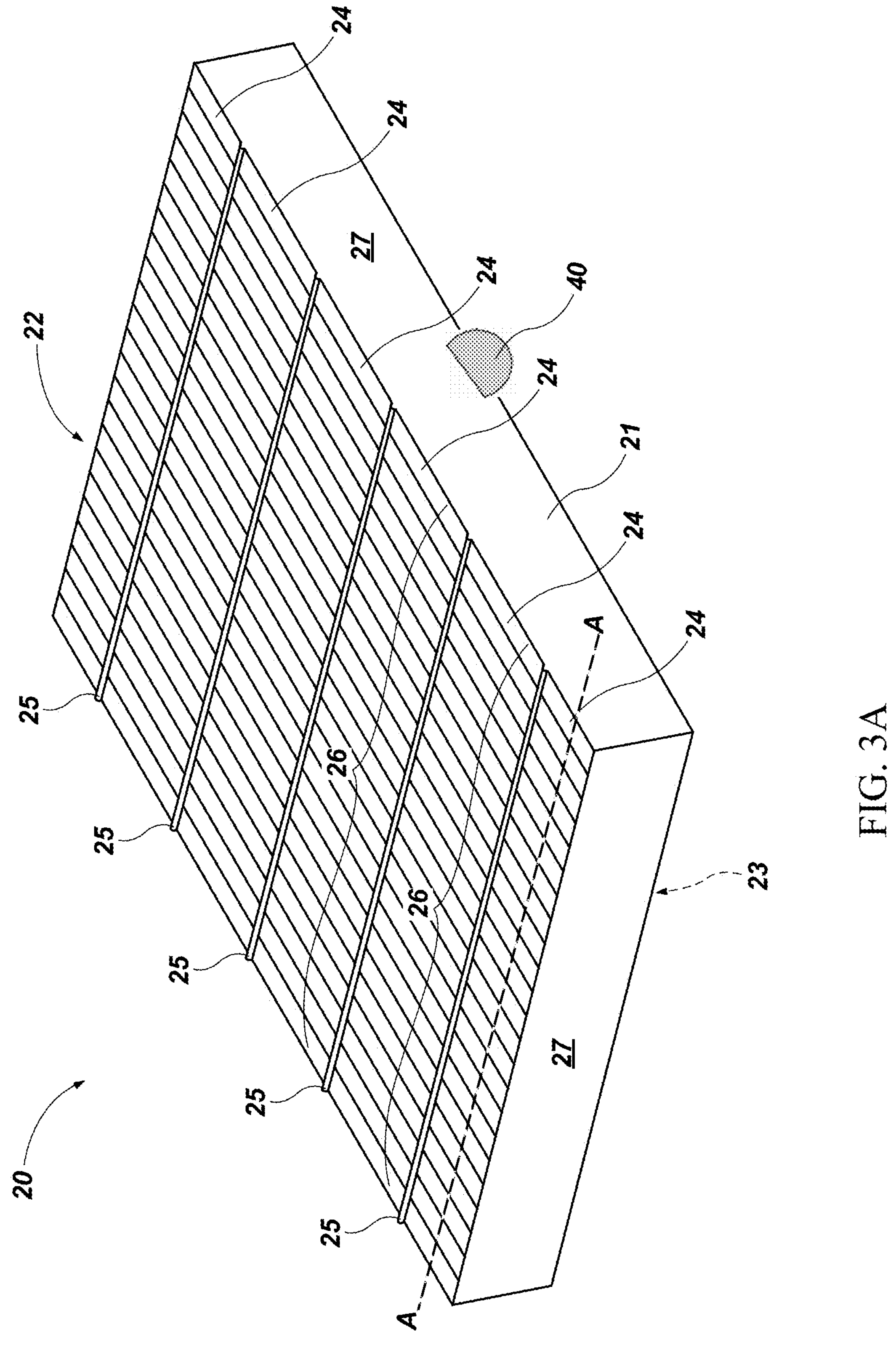
FIGS. 3A-3B illustrate perspective views of a filter media according to the present disclosure.
Figure 3B:
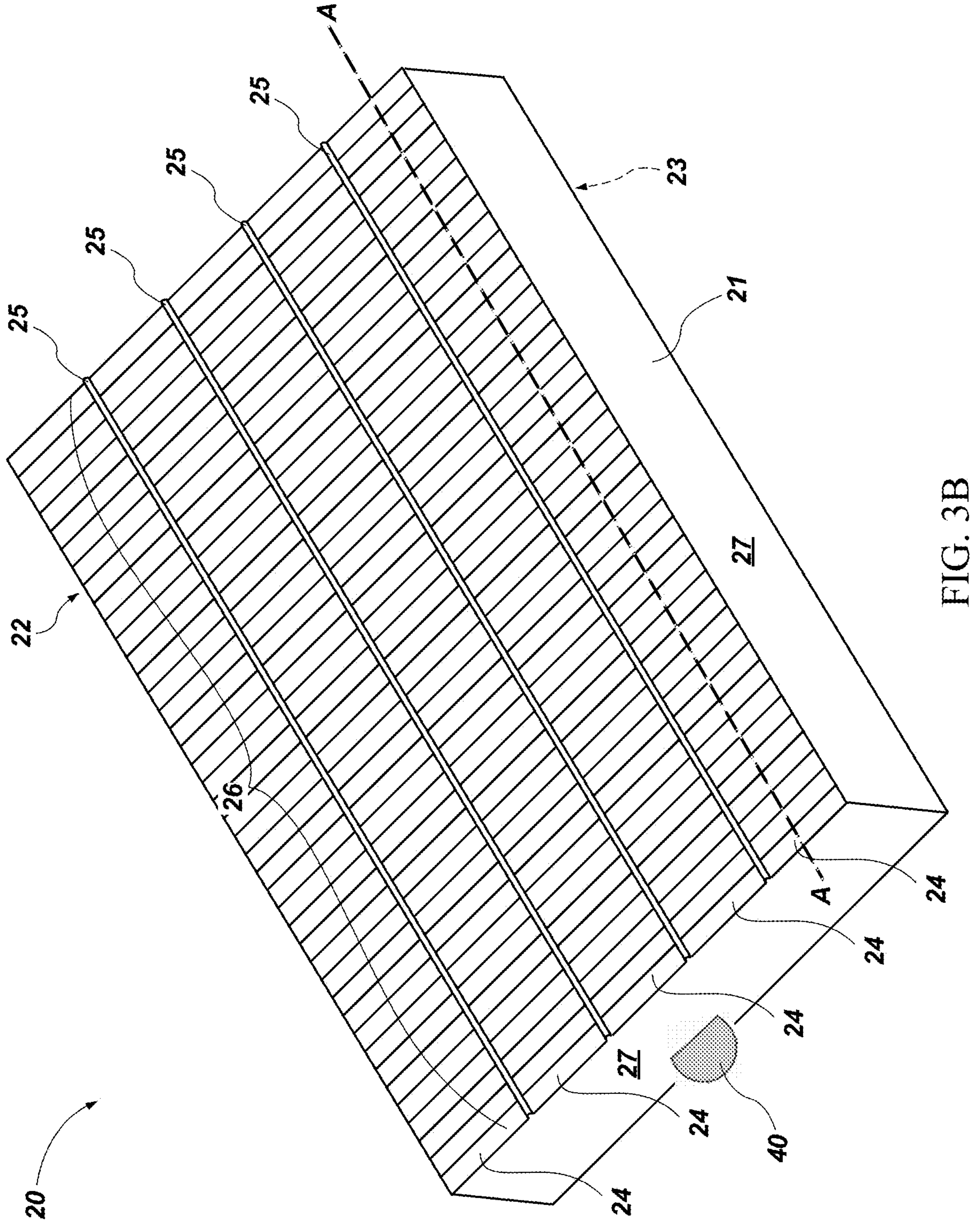

FIGS. 3A-3B illustrate perspective views of a filter media 20 according to the present disclosure. As illustrated, the filter media 20 includes a filter body 21 having a top surface 22 and a bottom surface 23 opposite the top surface 22. Top surface 22 and bottom surface 23 can also be characterized as an outer surface 22 and an inner surface 23, because the water being filtered flows through the filter from the top/outer surface 22 to the bottom/inner surface 23.

In some embodiments, the filter body 21 is comprised of or divided into a plurality of sections 24, with each section of the plurality 24 being comprised of or including a plurality of pleats 26. Surrounding the body 21 (e.g., encasing edges of the filter body 21), the plurality of sections 24, and/or the plurality of pleats 26 is a border 27. In some embodiments, the border 27 maintains a shape, rigidity, and integrity of the filter body 21 and/or the plurality of pleats 26. The border 27 may be adhesively secured to the filter body 21. In some embodiments, the border 27 together with the adhesive(s) 25 keeps the plurality of pleats 26 compressed within their respective sections of the plurality of sections 24.

Without the border 27, the plurality of pleats 26 may splay apart from each other or flatten out; the filter body 21 would then undesirably lose some shape and rigidity. In some embodiments, the border 27 is adhered to the filter body 21 using the same adhesive as the adhesive 25. The border 27 may be of the same material as the filter body 21 and, thus, the same material as the plurality of pleats 26. In some embodiments, the border 27 also filters out debris and particulates from water passing through the filter media 20, as the border 27 may be of the same material (i.e., the same filtering material) as that of the body 21 and, thus, the plurality of pleats 26.

As illustrated, the filter media 20 is substantially rectangular, though any cuboid or flat shape is considered herein. The filter media 20 may be a substantially non-circular shape. In other words, the filter media 20 has a substantially planar top surface 22 and a substantially planar bottom surface 23. The filter media 20 may be any substantially non-circular shape that allows the plurality of pleats 26 to be uniformly and consistently spaced apart from each other across a length and/or width of the filter body 21. Importantly, the filter media 20 may be any substantially non-circular shape that allows the plurality of pleats 26 to be uniformly and consistently spaced apart from each other without bending or curving the plurality of pleats 26 or the plurality of sections 24.

In some embodiments, a shape of the filter media 20 and/or the filter body 21 corresponds to (i) a shape of the filter frame 16 and/or (ii) a shape of the filter housing 10 (see FIG. 1). Regardless of the shape of the filter body 21 or filter media 20, it is important that the plurality of pleats 26 be maintained in a flat, non-curved configuration, such as illustrated. Specifically, as discussed more fully below, a flow of water or fluid across and through the filter media 20 should expose the water or fluid to an entirety or substantially an entirety of each individual pleat of the plurality of pleats 26. That is, the arrangement and configuration of each individual pleat of the plurality of pleats 26 maximizes an exposed surface area of each pleat to maximize the particles and debris that can be filtered out and removed from the water or fluid. In other words, the arrangement and configuration of the pleats minimizes the differentiation in distance between each pleat to minimize the chances of the pleats collapsing. For example, each pleat of the plurality of pleats 26 may have a substantially rectangular or cuboid configuration, such that each pleat has a first planar face and a second planar face. The arrangement of each individual pleat within the plurality of pleats 26 is such that each planar face of the pleat is fully exposed to a flow of water, thereby maximizing the exposed filter surface area of each pleat.

In some embodiments, the sections 24 are formed by a single rectangular piece of filter media being pleated by running multiple strips of adhesive along the single piece of rectangular filter media. For example, in the configuration shown in FIG. 3A, a single piece of rectangular filter media has had 5 strips of adhesive run substantially parallel along the length of the piece of rectangular filter media, and then the pleats were formed by folds, secured by the parallel lines of adhesive. More or fewer lines of adhesive can be used to form the filter media 20, resulting in more or fewer sections 24 of the filter media 20. In other configurations, the plurality of sections 24 may be joined to each other via adhesive 25, such as a waterproof adhesive, a water-resistant adhesive, glue, double-sided tape, and/or some other appropriate waterproof or water-resistant adhesive.

Each pleat of the plurality of pleats 26 may extend across a width of each section 24, such as extending from an adhesive 25 of a first section 24 to the adhesive 25 of a second section 24. In this way, individual pleats can be considered glued to or adhered to multiple sections, and/or multiple sides of the filter media 20. In some embodiments, the pleats can be glued on both sides of the filter media. That is, the pleats can be glued on the top/outer surface 22 as well as on the bottom/inner surface 23. For example, the filter can be formed by applying glue to a top surface 22 of the filter material and a bottom surface 23 of the filter material, and folding the filter material into pleats. Additionally, each pleat of the plurality of pleats 26 may extend from the top surface 22 to the bottom surface 23 of the filter body 21. In some embodiments, each pleat of the plurality of pleats 26 has a substantially cuboid or rectangular cross-section.

The size of the filter body 21 and, thus, the filter media 20 may correspond to a size of the filter housing 10 (and/or the filter frame 16) to receive and house the filter media 20. For example, in some embodiments, a length of the filter body 21 ranges from about 190 to 335 mm (7.5 to 13 inches), such as 200, 225, 250, 275, 300, 315, 325 mm, or a length within a range defined by any two of the foregoing values. A width of the filter body 21 may range from about 175 to 260 mm (6.5 to 10 inches), such as 180, 195, 200, 220, 240, 250 mm, or a width within a range defined by any two of the foregoing values. A thickness of the filter body 21 may range from about 15 to 60 mm (0.5 to 2.5 inches), such as 20, 30, 35, 40, 45, 50, 55 mm, or a thickness within a range defined by any two of the foregoing values. In other embodiments, other sizes, including larger or smaller, may be used as desired.

In some embodiments, a height of each pleat corresponds to a thickness of the filter body 21. That is, as each pleat of the plurality of pleats 26 extends from the top surface 22 to the bottom surface 23 of the filter body 21, the height of that extension may correspond to the thickness of the filter body 21. Similarly, a length of each pleat may correspond to a height of the filter media used to construct the pleats (either the total height, or the width of each individual section 24 of the plurality of sections 24). That is, as each pleat extends from an adhesive 25 of a first section 24 to the adhesive 25 of a second section 24, the distance of that extension may correspond to the width of each section 24. Each pleat may also have a width or thickness that corresponds to a thickness of the filter material used to construct the pleats and the filter media 20.

The filter body 21 and/or the filter media 20 may include a tab 40. The tab 40 may be disposed on the border 27 to orient the filter body 21 and filter media 20 for placement within the filter housing 10. As illustrated in FIGS. 3A-3B, the tab 40 is disposed within the same plane (e.g., parallel to) as the plurality of sections 24. This disposition of the tab 40 ensures a user will place the filter media 20 within the filter housing 10 such that the plurality of pleats 26 are adequately and fully exposed to a flow of water in order to maximize exposure of the useful or effective filter surface area of each pleat within the plurality of pleats 26.

Figure 4:
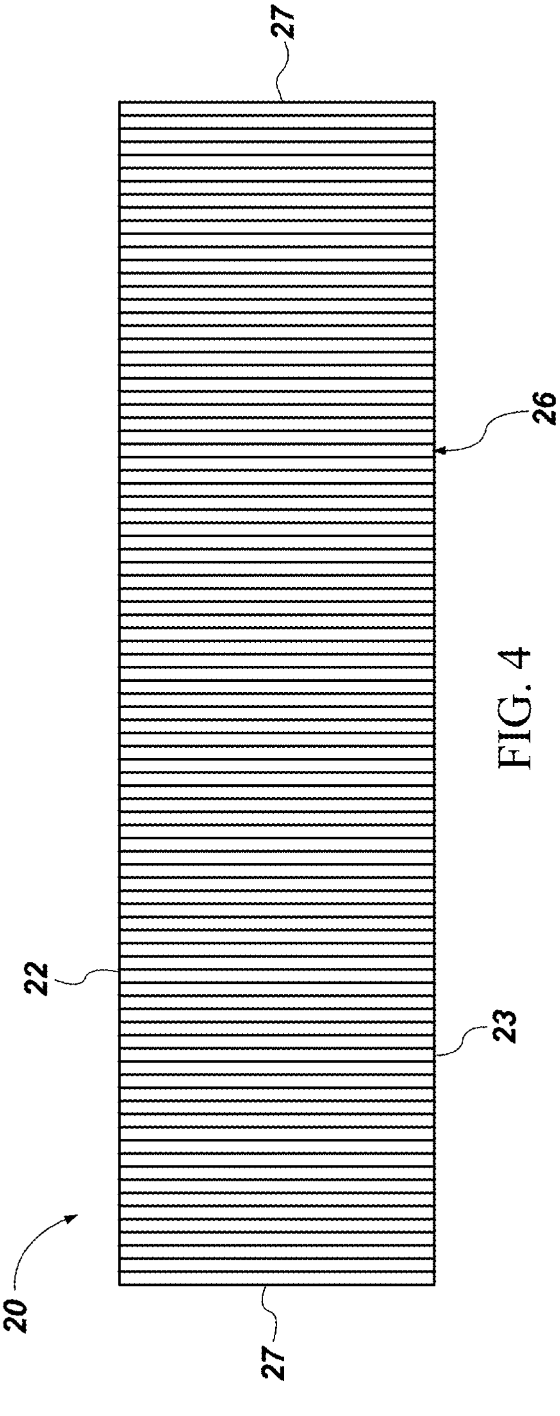
FIG. 4 illustrates a cross-sectional view of the filter media of FIGS. 3A-3B.

FIG. 4 illustrate cross-sectional views of the filter media 20 of FIGS. 3A-3B taken along line A-A. Specifically, FIG. 4 illustrates the cross-sectional profile of individual pleats 30 within the plurality of pleats 26 of each section 24. The spacing between each pleat 30 in FIG. 4 may be narrower than that illustrated in FIG. 3A or 3B. As clearly shown, a gap or distance 33 exists between each pleat 30 of the plurality of pleats 26. For example, given the substantially cuboid nature of the filter body 21, the gap 33 between each pleat 30 of the plurality of pleats 26 may have a substantially rectangular cross-section. That is, each pleat 30 has a first planar face 31, a second planar face 32, and the gap 33 is defined between planar faces 31, 32 of individual pleats 30. Without the border described herein, the gap 33 between each pleat 30 of the plurality of pleats 26 may have a cross-section that is more triangular. That is, the top surface 22 with the adhesive strip(s) 25 may have a plurality of pleats 26 that are connected, while the bottom surface 23 tends to have a plurality of pleats 26 which are splayed out. The border described herein prevents splaying of the filter media 20 to ensure even spacing between each pleat 30, from a top surface 22 to a bottom surface 23.

In some embodiments, the gap 33 between each pleat 30 is consistent across a length of the gap 33 from the top surface 22 to the bottom surface 23 (i.e., along a length of the pleat 30 and/or along a length of the planar faces 31, 32 of each pleat 30). The consistent gap 33 between each planar face 31, 32 of the pleats 30 allows water to fully flow into the gap 33 and through an entirety or substantially an entirety of each pleat 30. Put another way, the consistent gap 33 allows water to fully flow into the gap 33 and through an entirety or nearly an entirety of each planar face 31, 32 of each pleat 30. As such, the entirety or nearly the entirety of the useful or effective filter surface area for each pleat 30 is utilized in filtering out debris and particles from the water.

Using the entirety or nearly the entirety of the useful or effective filter surface area for each pleat 30 increases the effectiveness of the filter media 20 and decreases the rate at which filter media(s) 20 need to be replaced in any given spa, pool, or water containing vessel. As discussed above, conventional cylindrical filters are incapable of utilizing the entirety of the useful or effective filter surface area as (i) the gap between each pleat is not consistent along a length of the pleat and (ii) the pleats are not uniformly spaced apart from each other around the circumference of the cylindrical filter (see FIG. 6A).

The gap 33 may also be the same or substantially the same between each pleat 30 across a length and/or a width of the filter body 21. That is, the pleats 30 will be uniformly and consistently spaced apart from each other across the length and/or width of the filter body 21. In some embodiments, the gap 33 between the planar faces 31, 32 of the pleats 30 ranges from about 0.5 to about 5 mm, such as 0.6, 0.65, 0.8, 0.9, 1.0, 1.5, 2.0, 2.5, 3.0, 3.5, 4.0, 4.5 mm, or a gap within a range defined by any two of the foregoing values. Providing a consistent gap 33 that uniformly spaces each pleat 30 of the plurality of pleats 26 apart from each other allows water to fully flow (i) into the gap 33, (ii) through an entirety or nearly entirety of each pleat 30, (iii) through an entirety or nearly an entirety of the useful filter surface area of each pleat 30 (i.e., through an entirety of each planar face 31, 32), and (iv) through an entirety or nearly entirety of the filter media 20.

As before, using the entirety or nearly the entirety of the useful or effective filter surface area for each pleat 30 of the plurality of pleats 26 increases the effectiveness of the filter media 20 and decreases the rate at which filter media(s) 20 need to be replaced in a given spa, pool, or water containing vessel. This leads to decreased costs for a user to safely and hygienically enjoy a spa or pool, as well as decreased waste from disposing of filter medias 20.

Figure 5:
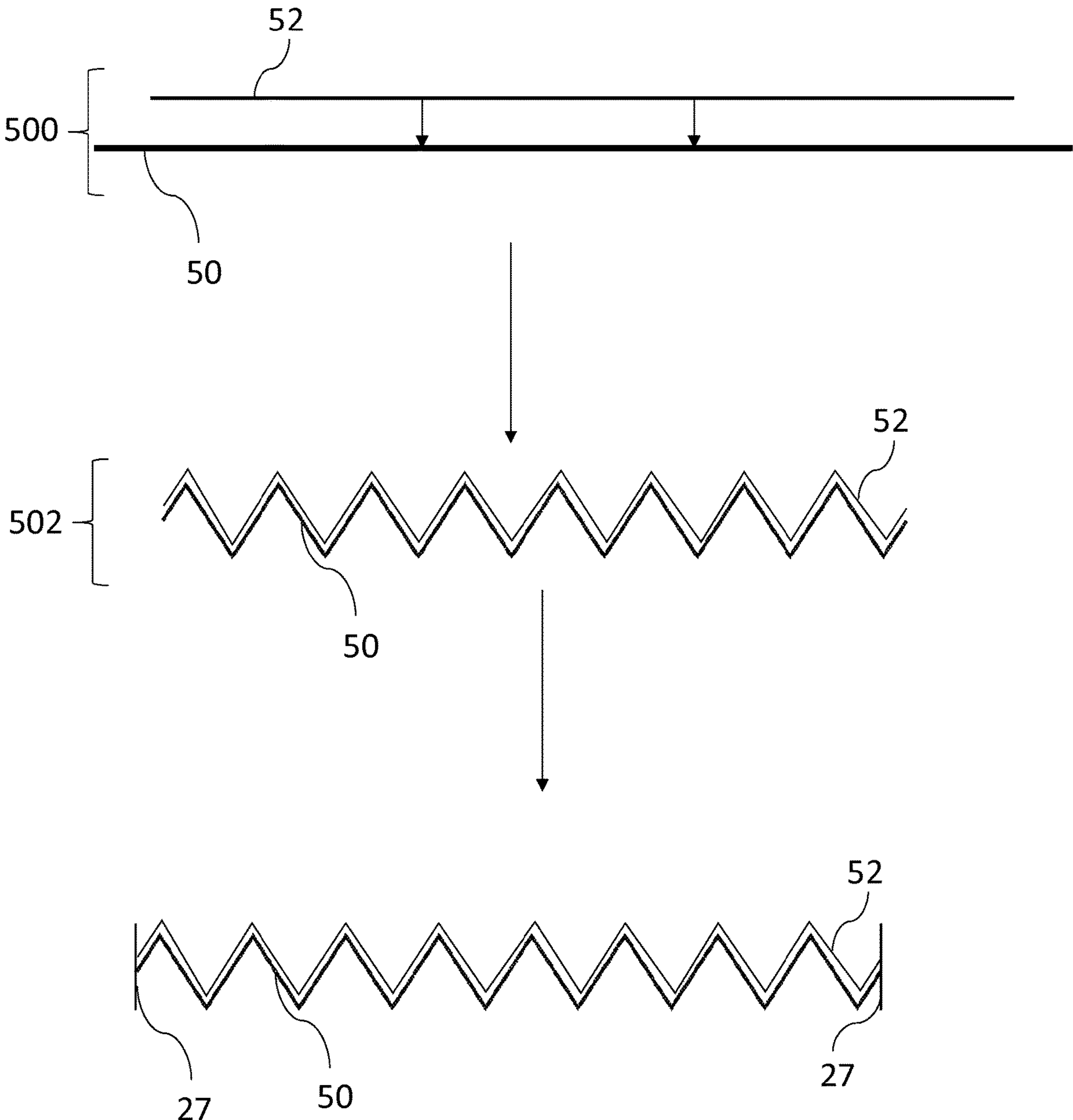
FIG. 5 schematically illustrates one embodiment of manufacturing or forming the filter media of FIGS. 3A through 4.

In some embodiments, the material forming the filter media 20 and, thus, the individual pleats 30 of the plurality of pleats 26 has a mesh rating. "Mesh" is a unit of measurement to determine how many (i.e., the number of) openings or pores are in one inch of a given material. For example, a material having a mesh of 150 has 150 openings or pores in one inch of the material. A higher mesh number or rating corresponds to a greater number of openings or pores per inch of material. This means that the size of each opening is smaller as the mesh rating increases in order to fit more openings per inch of material. This also means that the size of particle that can be captured by the material decreases as the mesh rating increases for the material. For example, a material with a mesh of 150 can capture particles as small as 105 microns. The material forming the filter media 20 may have a mesh rating of about 35 mesh to 700 mesh, such as 50, 80, 100, 120, 150, 200, 250, 300, 350, 400, 450, 500, 550, 600, 650 mesh, or a mesh within a range defined by any two of the foregoing values FIG. 5 schematically illustrates one embodiment of manufacturing or forming the filter media of FIGS. 3A through 4. In some embodiments, forming or manufacturing the filter media 20 involves layering one or more filter media material layers with one or more adhesive layers. For example, layer(s) of the filter material may be alternately stacked/layered with layer(s) of adhesive 25. For example, a single layer of filter material in a flat (i.e., not-pleated) configuration may be about 30 meters (100 feet) long. One or more single lines of adhesive may be laid out in a line along the length of the filter material (FIG. 5). The filter material can then be "accordioned" or folded to create pleats approximately 190-335 mm (7.5-13 inches) long, which corresponds to the overall length of the filter media 20 and/or the filter body 21.

As illustrated, one layer 50 of filter media material is layered with one layer of adhesive 52. Initially, the layer of filter material 50 and the layer of adhesive 52 are in a flat configuration 500. After layering the filter material 50 and the adhesive 52, the layers are scrunched or accordioned in a direction perpendicular to a plane of the filter material 50 and the adhesive 52. The filter material 50 and the adhesive 52 are now in an accordioned configuration 502.

After the filter material and adhesive layers have been accordioned, strips of material are adhered to outer edges of the accordioned filter material/adhesive. The strips of material will form the border 27 of the filter body 21. Placement of the border 27 around the outer edges of the accordioned filter material/adhesive will determine a shape of the filter body 21 and maintain the accordioned filter material/adhesive in the accordioned configuration.

In some embodiments, a user may desire to provide a non-circular shape to the filter body 21. When rectangular sheets of filter material and adhesive are utilized, the resulting filter body 21 may have a rectangular or cuboid shape (see the filter body 21 of FIGS. 3A-3B). However, a different non-circular shape for the filter body 21 may be desired. In such embodiments, the edges of the accordioned filter material/adhesive may be trimmed prior to attaching the border 27 around outer edges of the accordioned filter material/adhesive. Additionally, and/or alternatively, the border 27 may be applied around a rectangular accordioned filter material/adhesive and the edges may be subsequently trimmed to a desired shape (e.g., triangular, trapezoidal, rhombus, etc.). Additional strips of border material may be adhered to the trimmed edges to further secure the resulting filter body 21.

Importantly, regardless of the resulting shape of the filter body 21, the accordioned filter material/adhesive combination is not bent or curved into the desired shape. That is, the top/outside surface 22 is substantially planar, and the bottom/inner surface 23 is also substantially planar. The accordioned filter material/adhesive combination is kept in a flat configuration (see FIGS. 3A-3B), where the individual pleats of the plurality of pleats 26 extend from a top surface 22 to a bottom surface 23 of the filter body 21, and extend across a width of each section of the plurality of sections 24. Regardless of the resulting shape defined by edges of the filter body 21 or the border 27, the filter body 21 will have a substantially planar top surface 22 and a substantially planar bottom surface 23, which maximize the exposed filter surface area for each pleat of the plurality of pleats 26.

Flow of Fluid Through the Filter Media

Figure 6A:
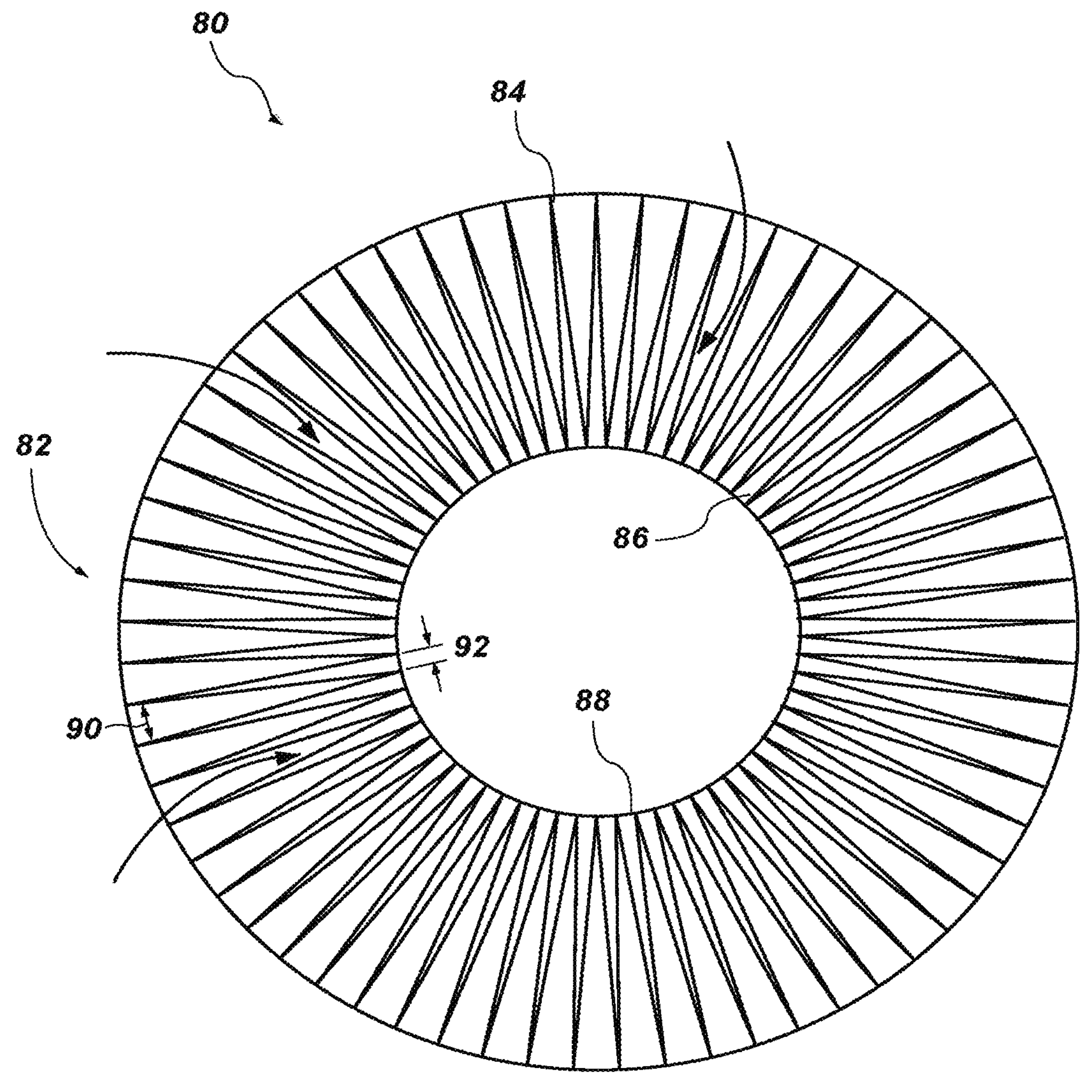
FIG. 6A illustrates a flow of water through a conventional filter and FIG. 6B illustrates a flow of water through the filter media of the present disclosure.
Figure 6B:
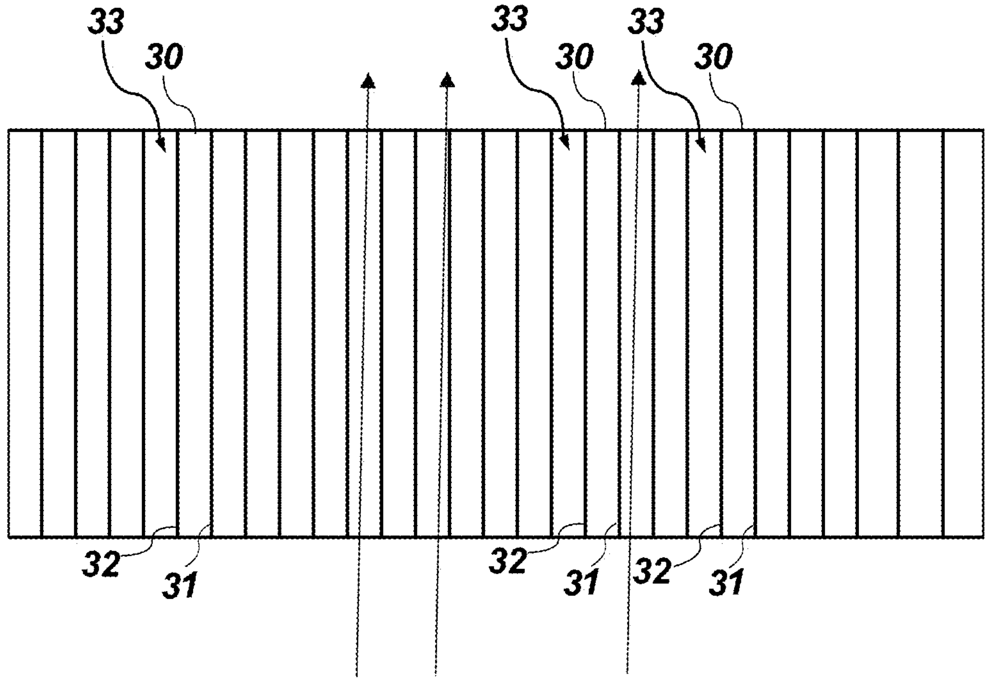

FIG. 6A illustrates a plan view of a conventional filter with arrows indicating a flow of water through the conventional filter. FIG. 6B illustrates a flow of water through the filter media 20 of the present disclosure. When water enters a conventional filter 80, it does so through the outer surface 82, which is formed by the outer points 84 of each pleat 86 of the conventional filter 80. Due to the cylindrical nature, the overall shape of the pleats 86 within the conventional filter 80 approximates a star, where a diameter of the outer surface 82 is greater than a diameter of the inner surface 88. Neither the outer surface nor the inner surface is planar. The space 90 between each outer point 84 of each pleat 86 is wider than the space 92 between each pleat 86 at the inner edge 88 of the conventional filter 80. In many cases, the space 92 between each pleat 86 at the inner edge 88 is negligible and does not allow water to pass completely through the conventional filter 80 from the outer edge 82 to the inner edge 88.

Rather, water often gets stuck somewhere in the middle of the pleat 86 without passing fully through the pleat 86. Often, water does not flow much past the outer points 84 of each pleat 86 toward the inner surface 88. As a result, the outer points 84 become clogged and filled with debris and particles well before the portions of the pleat 86 near the inner surface 88 become clogged. This greatly decreases the efficiency and effectiveness of the conventional filter 80. Thus, users are required to replace the filters 80 more frequently in order to maintain the same level of cleanliness in a pool or spa. Changing the filters 80 more frequently increases the cost of enjoyment of the pool or spa for a user as well as increases the number of filters 80 thrown away as waste each season.

In contrast, as shown in FIG. 6B, when water enters the filter media 20 of the present disclosure, water flows completely or nearly completely through the filter media 20 from the top/outer surface 22 to the bottom/inner surface 23. Referring briefly to FIG. 4, each pleat 30 is uniformly and consistently spaced apart from an adjacent pleat 30 by a gap 33. The gap 33 may consistently extend along a length of each pleat 30, such as along an entirety of each planar face 31, 32 of each pleat 30. When water enters the filter media 20, it is able to flow into the gaps 33 between the pleats 30 and be fully exposed to each planar face 31, 32 of the pleat 30. As the gap 33 is consistent across each planar face 31, 32, the water does not meet any obstructions or get blocked as it flows through the entirety or nearly the entirety of the filter media 20. In this way, an entirety or nearly an entirety of each planar face 31, 32 is fully exposed to the flow of water. This results in each pleat 30 capturing debris and particles from the water, from the top/outer surface 22 through the bottom/inner surface 23. There are no portions of the pleats 30 or the filter media 20 that become clogged before other portions of the pleats 30 or filter media 20. Put another way, the filter media 20 clogs at the same rate (or substantially the same rate) from the top/outer surface 22 to the bottom/inner surface 23, leading to an overall greater lifespan for the filter media 20.

When the filter media 20 has become clogged, a user can easily replace the filter media 20 by grasping opening the filter housing 10, grasping the tab 40, and pulling the filter media 20 out of the housing 10 (see FIGS. 1 and 3A-3B). The old filter media 20 will be fully saturated and clogged with debris across an entirety of the filter media 20. A new filter media 20 may then be placed within the filter housing 10, where the new filter media 20 is orientable within the filter housing 10 via the tab 40.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It should also be noted that some of the embodiments disclosed herein may have been disclosed in relation to a particular water-containing vessel (e.g., a spa); however, other vessels (e.g., pools, tubs, swim spas, etc.) are also contemplated. A spa is also known in the industry as a hot tub and is generally formed of a concave shell to receive and contain water. Structures, such as a jet, can extend through the concave shell to move water from a surface outside the spa to a surface inside the spa or shell. Surfaces inside the shell are referred to as more “proximal” while surfaces that extend through the shell are referred to as “distal.” A proximal side of a jet faces the spa shell where the user relaxes, and the jet can provide hydrotherapy to the user in the spa.

In one embodiment, the terms “about” and “approximately” refer to numerical parameters within 10% of the indicated range. The terms “a,” “an,” “the,” and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the author(s) of this disclosure for carrying out the embodiments disclosed herein. Of course, variations on these described embodiments will become apparent to those of ordinary skill in the art upon reading the foregoing description. The author(s) expects skilled artisans to employ such variations as appropriate, and the author(s) intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A filter media for filtering water in a pool or spa comprising:

a plurality of pleats formed of a filter material, the pleats formed by applying a layer of adhesive to a top surface of the filter material, including over pleat valleys of the top surface and over pleat peaks of the bottom surface, and folding the filter material into pleats, the plurality of pleats arranged in a plurality of sections, where each section is separated from an adjacent section by the layer of adhesive and each section is adhered to the adjacent section through the layer of adhesive; and a border joined to and surrounding a periphery of the filter media, the border for maintaining a planar shape of a bottom surface of the filter media and the border being made of the filter material, and the border for maintaining the consistent spacing along the length of the pleat between each pleat of the plurality of pleats within each section;

each pleat of the plurality of pleats extending across a width of the filter media, each pleat of the plurality of pleats comprising a consistent spacing along a length of the pleat; and the plurality of pleats being uniformly spaced apart from each other along a length and/or width of the filter media, such that water passing through the filter media passes through an entirety of each pleat.

2. The filter media of claim 1, wherein the shape of the filter media is substantially rectangular.

3. The filter media of claim 2, wherein the filter media has a length ranging from 190 to 335 mm, a width ranging from 175 to 260 mm, and a thickness ranging from 15 to 60 mm.

4. The filter media of claim 1, wherein the border is adhesively joined to the periphery of the filter media.

5. The filter media of claim 1, wherein the filter material of the filter media comprises a material having a mesh ranging from 35 mesh to 700 mesh.

6. A filter media for filtering water in a pool or spa, the filter media comprising:

a body comprising a top surface, a bottom surface, and a plurality of pleats formed of a filter material and arranged in a plurality of sections where each section is adhered to an adjacent section through a layer of adhesive, such that each pleat of the plurality of pleats is adhered to two sections, each pleat of the plurality of pleats comprising a consistent spacing along a length of the pleat between each pleat of the plurality of pleats, such that fluid passing through the filter media is able to pass through an entirety of each pleat;

the layer of adhesive applied to a top surface of the filter material, including over pleat valleys of the top surface and over pleat peaks of the bottom surface; and a border joined to and surrounding a periphery of the body, the border for maintaining a planar shape of one or more of the top surface and bottom surface of the filter media, and the border for maintaining the consistent spacing along the length of the pleat between each pleat of the plurality of pleats within each section.

7. The filter media of claim 6, wherein:

each pleat of the plurality of pleats extending across a width of each section and extending from the top surface to the bottom surface of the body, and the plurality of pleats being uniformly spaced apart from each other along a length and/or width of the filter media, such that the fluid passing through the filter media passes through each pleat of the plurality of pleats.

8. The filter media of claim 6, further comprising a tab disposed on the border, the tab for orienting the filter media within a filter housing.

9. The filter media of claim 8, wherein the filter media has a length ranging from 190 to 335 mm, a width ranging from 175 to 260 mm, and a thickness ranging from 15 to 60 mm.

10. The filter media of claim 6, wherein the shape of the filter media is not circular.

11. The filter media of claim 6, wherein the border comprises a woven material.

12. The filter media of claim 6, wherein the border comprises a non-woven material.

13. The filter media of claim 6, wherein the border is adhesively joined to the periphery of the body using the same adhesive joining adjacent sections together.

14. A method of filtering water in a pool or spa, the method comprising:

selecting a filter media, wherein the filter media comprises a body comprising an outer surface, an inner surface, and a plurality of pleats arranged in a plurality of sections, each section of the plurality of sections adhered to an adjacent section through a layer of adhesive, each pleat comprising a consistent spacing along a length of the pleat between each pleat, the layer of adhesive applied to a top surface of the filter material, including over pleat valleys of the top surface and over pleat peaks of the bottom surface, the layer of adhesive maintaining the consistent spacing such that water passing through the filter media is able to pass through an entire length of each pleat; and a border surrounding the body and for maintaining a planar shape of the outer surface and the inner surface of the filter media, the border and the body comprising the same filter material;

placing the filter media within a filter media housing; and passing water through the filter media, from the outer surface to the inner surface, the water able to pass through the entire length of each pleat of the plurality of pleats.

15. The method of claim 14, wherein selecting a filter media comprises selecting a filter media wherein each pleat of the plurality of pleats of the filter media extends across a width of each section of the plurality of sections and extends from the outer surface to the inner surface of the body.

16. The method of claim 14, wherein selecting a filter media comprises selecting a filter media wherein each pleat of the plurality of pleats comprises a consistent spacing along a length of the pleat such that fluid passing through the filter media passes through an entirety of each pleat.

17. The method of claim 14, wherein selecting a filter media comprises selecting a filter media wherein the pleats of the plurality of pleats are uniformly spaced apart from each other along a length and/or width of the filter media, such that the fluid passing through the filter media passes through each pleat of the plurality of pleats.

18. The method of claim 14, wherein selecting a filter media comprises selecting a filter media wherein the filter media has a length ranging from 190 to 335 mm, a width ranging from 175 to 260 mm, and a thickness ranging from 15 to 60 mm.

19. The method of claim 14, wherein selecting a filter media comprises selecting a filter media wherein the filter media comprises a woven material, a non-woven material, or combinations thereof.

20. The method of claim 14, wherein selecting a filter media comprises selecting a filter media wherein the filter media comprises a material of at least 100 mesh.

* * * * *